Sept. 11, 1928.

J. W. KITTREDGE

HOISTING BLOCK

Filed March 11, 1926

1,684,185

2 Sheets-Sheet 1

Inventor

John W. Kittredge

Sept. 11, 1928.

J. W. KITTREDGE 1,684,185

HOISTING BLOCK

Filed March 11, 1926  2 Sheets-Sheet 2

Inventor

John W. Kittredge

Patented Sept. 11, 1928.

1,684,185

UNITED STATES PATENT OFFICE.

JOHN W. KITTREDGE, OF AKRON, OHIO.

HOISTING BLOCK.

Application filed March 11, 1926. Serial No. 93,952.

The objects of my invention are:—

1st. To lift the load at slow speed, and thereby secure great lifting force; to lower the load at faster speed, for example, four times its lifting speed for same speed of driving wheel; and to have the load at all times controlled by the brake so that there can be no possibility of its dropping.

2nd. To provide safety means to prevent excessive loading of the hoist by its own lift, but to have it hold to the breaking point, should an excessive load be put on it by independent means, as by lowering the load onto it from a larger chain block.

3rd. To have all mechanism simple and compact, have it hang evenly from the supporting hook, and have it protected from dirt and from accidental injury.

I attain these objects by the mechanism shown in the accompanying drawings in which,—

Figure 1:
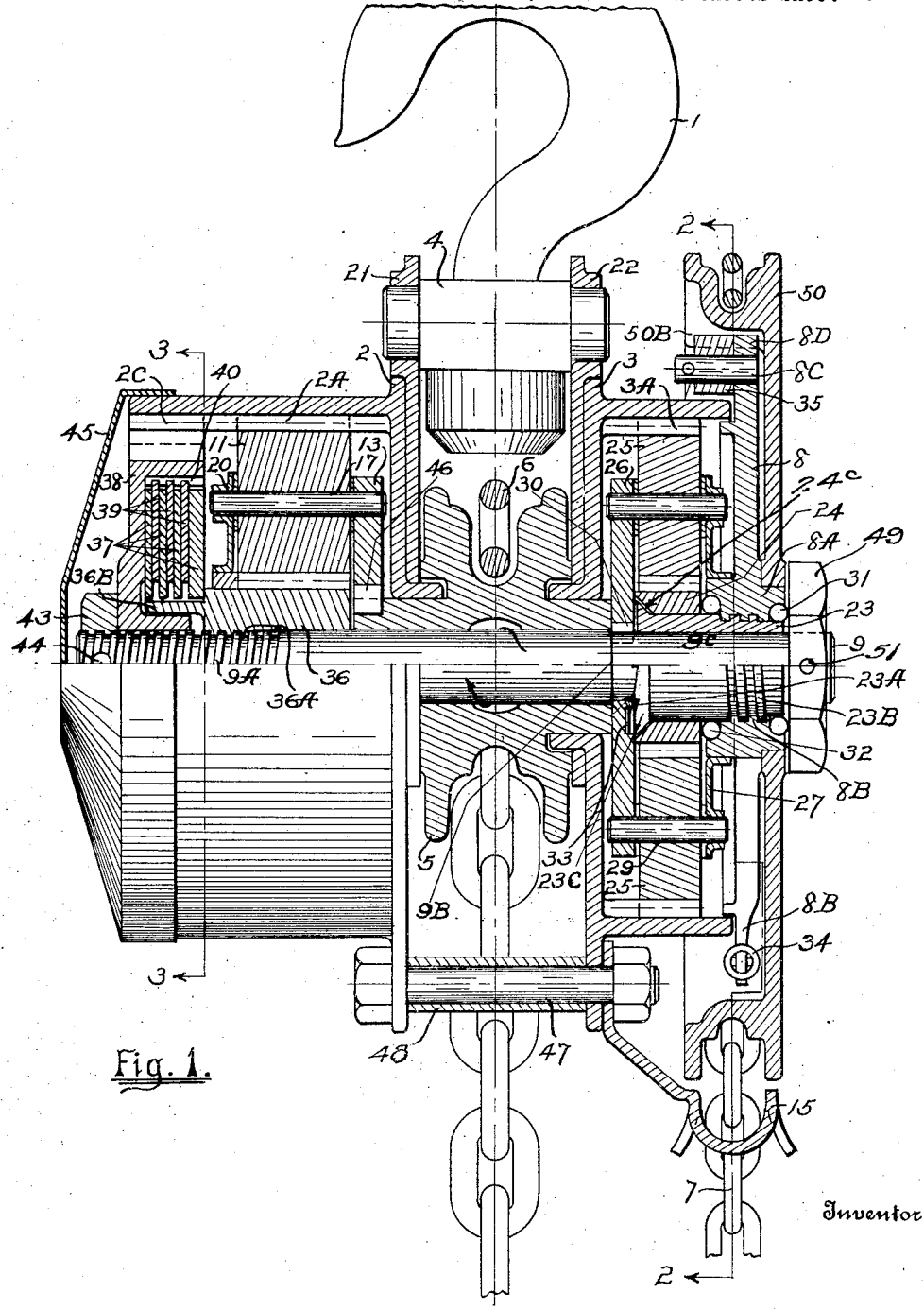
Figure 2:
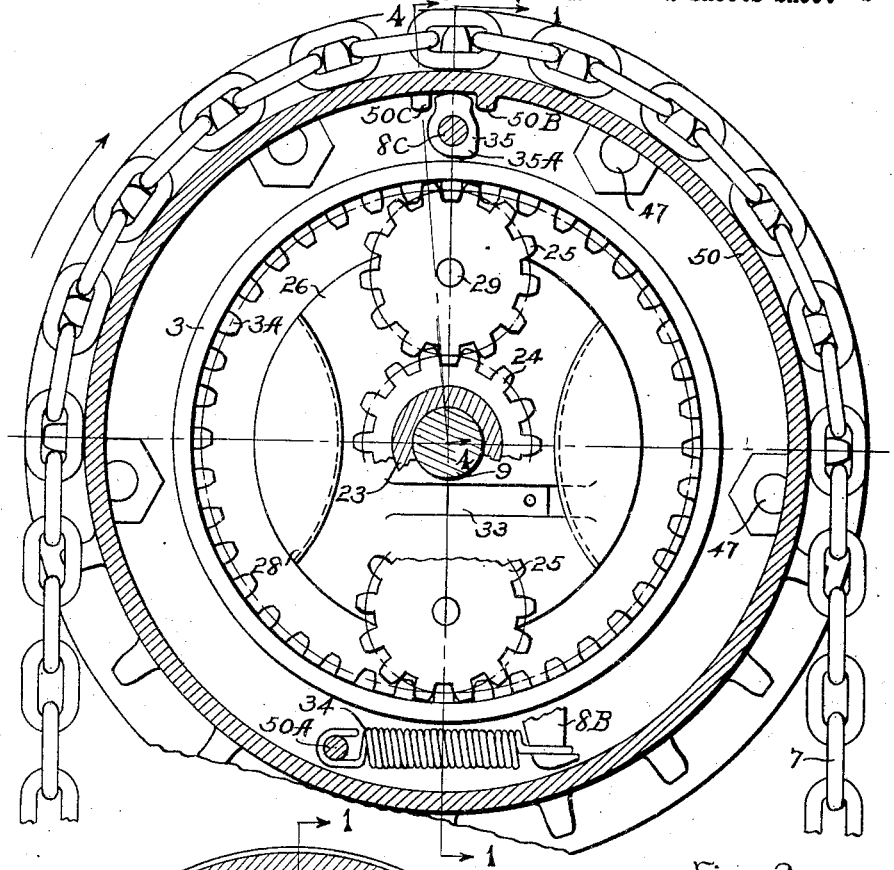
Figure 3:
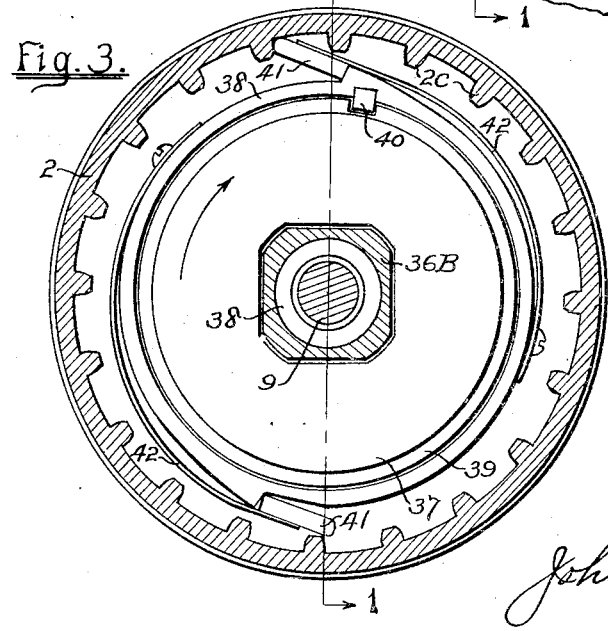
Figure 4:
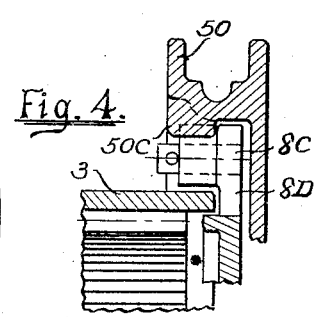

Fig. 1 is a longitudinal section on line 1—1 of Fig. 2 and line 1—1 of Fig. 3. Fig. 2 is a cross-section on line 2—2 of Fig. 1, with carrier plate 27 removed to show the gears; line 2—2 being a broken line to show the driving spring. Fig. 3 is a cross-section on line 3—3 of Fig. 1. And Fig. 4 is a longitudinal section on line 4—4 of Fig. 2.

For clearness of description, parts fastened rigidly together are cross-hatched alike, even though they may be different pieces of metal. A given piece is designated by a numeral, as 2, and different edges or faces of that piece by that numeral with letters, as $2^A$, $2^B$, $2^C$, etc. A given piece carries the same number throughout the several views.

In this specification and claims, "forward" is understood to mean the direction of lift, and "backward" the direction of lowering. "Between" is understood to have reference to the sequence of driving operations, and not to physical position, as the brake is "between" the two gear trains. "Driving through a gear train" is understood to mean with the gears meshing and changing the speed of the load wheel according to the gear ratio of the train. "Driving direct" is understood to mean with a gear train not functioning as such nor changing the speed of the load wheel according to the ratio of the train, even though the gears may be meshing, and even though one or more elements of the gear train may be functioning as driving elements.

When the driving wheel drives the load wheel backward under load, it is understood that the driving wheel simply releases the brake and the weight of the load turns the load wheel backward. The driving wheel drives only in the sense that it controls the brake and the brake controls the load which is lowering by gravity, but the two wheels always run at definite speed ratios. The brake is called "a brake" through-out the specification and claims, and its parts are called "brake-box 38," "brake-leaves 37 and 39", to distinguish them from the "clutch" on the opposite end of the drive shaft. It will be understood however, that on forward drive, a number of the brake parts are functioning as a clutch; that they are transmitting and not retarding motion, and that the "brake" is thus a part of the driving mechanism. The arrows, in every case, indicate the hoist running in the direction of lift.

The description of my mechanism is as follows:—

The main frames or gear cases 2 and 3 are bound firmly together by the bolts 47 and spacers 48. In the embodiment here shown, these frames are of cast metal and are supported by the steel links 21 and 22, the swivel bar 4, and the hook 1. A driven wheel or load wheel or sprocket 5 is journaled in the frames 2 and 3 and carries a load chain 6. The drive shaft 9 passes centrally through the load wheel 5. Sleeve 23 is free to revolve or to slide for a short distance on shaft 9. Gear 24 is free to revolve or to slide for a short distance on sleeve 23. Cone surface $24^C$ on gear 24 engages a corresponding cone surface $23^C$ on sleeve 23, forming a cone clutch. All are held to place by nut 49 and pin 51. Gear 24 meshes with planet gears 25, and gears 25 mesh with annular gear $3^A$. Gear $3^A$ is rigid with the frame 3 and is therefore stationary at all times.

A carrier comprised of plates 26 and 27 fastened rigidly together by spacers 28 carries pins 29 and planet gears 25 around the drive shaft 9. Plate 26 is keyed rigidly to drive shaft 9 by key 30. Wheel 8 is carried on sleeve 23 by ball bearings 31 and 32, and right hand screw thread $8^B$ of wheel 8 engages a corresponding screw thread $23^B$ of sleeve 23. The arrangement insures that wheel 8 shall turn through partial revolution on sleeve 23 with less friction than sleeve 23 shall turn on shaft 9 and within gear 24. Sleeve 23 has ratchet $23^A$ on its end. Spring 33, recessed in plate 26, engages ratchet $23^A$ and permits sleeve 23 to turn arrow-wise with relation to plate 26, but prevents it from turning backward. Carrier 26 fits on turned down portion $9^C$ of shaft 9, and against shoulder $9^B$.

Hand chain 7 drives hand wheel 50 and is guided to place by chain guide 15. Hand wheel 50 may turn through a partial revolution on hub $8^A$ of wheel 8, but, under ordinary loads, is prevented from so turning by spring 34 anchored to lug $8^B$ of wheel 8 and to stud $50^A$ rigid with wheel 50. Wheel 8 carries pin $8^C$ set rigidly in lug $8^D$ of said wheel 8, and cam 35 is carried on pin $8^C$ and adapted to turn thereon through a small angle. Lug $50^B$ forms a stop for both lug $8^D$ and cam 35, as shown in Figs. 1 and 2. Lug $50^C$ engages cam 35 only, as shown in Figs. 2 and 4. Normally, with lug $8^D$ bearing against lug $50^B$ under the action of the spring 34, there is clearance between toe $35^A$ and frame 3.

A carrier comprised of plates 13 and 20 fastened rigidly together by spacers carries pin 17 and planet gears 11 around drive shaft 9, and planet gears 11 mesh with central gear 36 and annular gear $2^A$ entirely similar to planetary gear train $24$—$25$—$3^A$, hereinbefore described and illustrated. Plate 13 is keyed rigidly to load wheel 5 by key 46. Gear 36, however, is carried direct on shaft 9, and left hand screw thread $36^A$ of the gear-nut 36 engages a corresponding screw thread $9^A$ of the shaft 9. The projecting end $36^B$ of gear-nut 36 is square and carries alternate brake leaves 37, which may slide longitudinally on $36^B$, but are constrained to turn therewith. Brake-box 38 turns freely on the periphery of the screw threads $9^A$ and carries alternate brake leaves 39, which may slide longitudinally on key 40 set rigidly in box 38, but the leaves are constrained to turn with the box 38. Box 38 carries pawls 41 thrown outward by springs 42 and into engagement with ratchet teeth $2^C$, rigid with frame 2. In the embodiment here shown, ratchet $2^C$ is simply a continuation of gear $2^A$ with alternate teeth omitted. This ratchet arrangement permits brake-box 38 to revolve forward or arrowwise, but not backward. A nut 43 and pin 44 hold the parts in place. This forms a leaf brake. The end is covered by cap 45.

The operation of my mechanism is as follows:—

To hoist a load, the operator turns the chain wheel forward or arrow-wise. With normal load, this turns wheel 8 forward through the spring 34. Wheel 8 turns on balls 31 and 32 and as a clutch, through the action of screw $8^B$—$23^B$, binds gear 24 between the balls 32 and the cone surface $23^C$ of sleeve 23. Then as wheel 50 and wheel 8 continue to turn forward, sleeve 23 turns forward on shaft 9, gear 24 turns with sleeve 23 and drives planet gears 25 and carrier 26—27 as a planetary gear train, and carrier 26 drives shaft 9 through key 30.

Under the action of the load, the wheel 5 and carrier 13—20 resist turning. Shaft 9 then turns in gear-nut 36 until it presses brake leaves 37 and 39 firmly together and against brake-box 38, and then these parts turn with the shaft 9, drive the gears 11, carrier 13 and load wheel 5 and lift the load. When the operator lets go the hand chain, pawls 41 lock in ratchet $2^C$ and the backward pull of the load keeps the parts tightly gripped so that the load cannot run down. In lifting the empty hook, the operation is practically the same.

If gears 24 and 36 have 14 teeth each, gears 25 and 11 have 13 teeth each, and gears $3^A$ and $2^A$ have 40 teeth each, then in hoisting, hand wheel 50 turns 3.857 times to turn shaft 9 once, shaft 9 turns 3.857 times to turn load wheel 5 once, and hand wheel 50 turns 14.876 times to turn load wheel 5 once. If pitch diameter of hand wheel is 12.800 inches and pitch diameter of load wheel is 4.510 inches, then the ratio of hand chain to load chain in hoisting is 42.224 to 1, and a man can lift a two ton load.

To lower a load, the operator turns the hand wheel 50 backward. Lug $50^B$ then bears against lug $8^D$ and turns wheel 8 backward. Spring 33 prevents sleeve 23 from turning backward relatively to plate 26. Wheel 8, therefore, turns on balls 31 and 32, presses itself firmly against nut 49 and presses sleeve 23 firmly against plate 26 through the action of screw $8^B$—$23^B$. It thus forms a double clutch, grips plate 26 and nut 49, and releases gear 24. Then as wheel 8 continues to turn backward, it turns sleeve 23 and carrier 26 direct, all firmly locked together by friction as well as by spring 33 and ratchet $23^A$. And carrier 26 turns shaft 9. As carrier 26—27 turns backward, stationary gear $3^A$ actuates gears 25, and gears 25 actuate gear 24 which spins idly on sleeve 23.

As shaft 9 turns backward with brake-box 38 held stationary by pawls 41 and ratchet $2^C$, it screws gear nut 36 away from box 38, relieves the pressure between the brake leaves, and allows them to slip. As they slip, the gear-nut 36, under the action of the load, again tightens them, holding the load at any point or lowering it safely by the backward rotation of the shaft 9.

Thus, in lowering, the planetary gear train 24—25—$3^A$ runs idly, and the mechanism lowers through the gear train 36—11—$2^A$ only. With dimensions above given, this gives ratio of hand chain to load chain on lowering of 10.947 to 1, or approximately four times the hoisting speed.

In lifting a normal or proper load, hand wheel 50 turns wheel 8 forward through spring 34 as above stated. With excessive load, wheel 8 resists turning, hand wheel 50 turns forward through a small angle with wheel 8 and stud $8^c$ stationary, and stretches the spring 34. As wheel 50 turns with stud $8^c$ stationary, lug $50^c$ turns cam 35 on stud $8^c$ and throws toe $35^A$ into locking engagement with the outside surface of frame 3. Any further pull on the hand chain then simply pulls on the frame and is not transmitted to the gearing. Hence the parts cannot be strained by the block's own lift. If, however, an excessive load is lowered onto the block, the brake, gear train 36—11—$2^A$, the load wheel 5, and chain 6 hold it until the chain or other part breaks, and the locking cam 35 does not function at all.

This invention is not limited to the embodiment here shown. The hoist may be power driven, may have cable instead of chain, have band brake instead of leaf brake, and other modifications, and still come within the spirit of my invention.

Having thus described my invention, I claim:—

1. In a hoisting block, the combination of a driving wheel, a drive shaft, a drive connection from the driving wheel to the drive shaft, a driven wheel, a brake, a planetary gear train comprising a central gear, a planet gear member, a carrier, and an annular gear, and a screw connection in the said brake between the drive shaft and the central gear whereby backward rotation of the central gear sets the brake and backward rotation of the drive shaft releases the brake.

2. In a hoisting block, the combination of a driving member, a drive shaft, a driven wheel, a drive connection from the drive shaft to the driven wheel, a planetary gear train, a connection from an element of the planetary gear train to the drive shaft, and means whereby forward rotation of the driving member locks it to an element of the planetary gear train and backward rotation of the said driving member locks it direct to the drive shaft.

3. In a hoisting block, the combination of a driving member, a driven wheel, a drive shaft, a brake, a drive connection from the drive shaft to the driven wheel through the brake whereby the brake controls the driven wheel in its backward rotation, a planetary gear train comprising a central gear, a planet gear member, a carrier rigid with the drive shaft, and an annular gear, and means whereby forward rotation of the driving member locks it to the central gear and backward rotation of the driving member releases it from the central gear and locks it direct to the drive shaft.

4. In a hoisting block, the combination of a driving member, a drive shaft, a planetary gear train and a connection from an element thereof to the drive shaft, a clutch connection between the driving member and the central gear of the planetary gear train adapted to grip on forward rotation of the driving member and to release on backward rotation thereof, a clutch connection between the driving member and the drive shaft adapted to grip on backward rotation of the driving member and release on forward rotation thereof, a second planetary gear train, a driven wheel, a connection between the driven wheel and an element of the second planetary gear train, a brake adapted to control the driving element of the second planetary gear train in its backward rotation, and connecting means from the drive shaft to the said driving element of the second planetary gear train through the brake whereby the drive shaft controls the brake.

5. In a hoisting block, the combination of a driving wheel, a driven wheel, driving mechanism therebetween, a spring in the said driving mechanism adapted to yield at a given forward torque of the driving wheel, and means controlled by the said spring adapted to lock an element of the driving mechanism against forward rotation.

6. In a hoisting block, the combination of a driving wheel, a driven wheel, driving mechanism therebetween adapted to drive the driven wheel forward against normal resistance at a given speed ratio, to drive the driven wheel backward at a different speed ratio, and means adapted to lock an element of the driving mechanism against forward rotation on excessive resistance of the driven wheel.

7. In a hoisting block, the combination of a frame, a driving wheel, a driven wheel, driving mechanism therebetween, a member on an element of the driving mechanism, the forward torque of the driving wheel tending to put that member into locking engagement with the frame, a spring in the driving mechanism tending to hold the said member clear of the frame, said spring adapted to yield on a given forward torque of the driving wheel.

8. In a hoisting block, the combination of a driving wheel, a driven wheel, driving mechanism therebetween adapted to drive the driven wheel forward against normal resistance, and a lock on an element of the driving mechanism operated by excessive resistance of the driven wheel to lock the said element to another element of the hoisting block and thereby prevent forward rotation.

9. In a hoisting block, the combination of a driving wheel, a load wheel, driving mechanism therebetween, means in the said driving mechanism which couple said driving wheel to an element of said mechanism upon forward rotation of said wheel and thereby form a drive connection between said wheels, means in the said driving mechanism which couple said driving wheel to another element of said mechanism upon backward rotation of said wheel and thereby form a different drive connection between said wheels, and friction members in the said driving mechanism controlled by the driving wheel adapted to control the backward rotation of the load wheel at all times.

10. In a hoisting block, the combination of a driving wheel, a driven wheel, a gear train, a drive shaft, clutch mechanism adapted on forward rotation of the driving wheel to drive said shaft through the gear train and on backward rotation of the driving wheel to drive said shaft direct, a brake between the shaft and the driven wheel adapted to control the backward rotation of said wheel at all times, and a drive connection from the shaft to the driven wheel through the brake.

11. In a hoisting block, the combination, of a driving wheel, a load wheel, driving mechanism therebetween comprising a gear train adjacent to the load wheel and adapted to drive the said load wheel at all times, a second gear train remote from the load wheel, connecting means between said gear trains, clutch mechanism adapted on forward rotation of the driving wheel to drive the first gear train through the second gear train and on backward rotation of the driving wheel to drive the first gear train direct, and a brake on the driving element of the first gear train adapted to control the backward rotation thereof.

12. In a hoisting block, the combination of a driving wheel, a load wheel, means to drive said load wheel at one speed ratio in one direction and at a different speed ratio in the opposite direction, clutch mechanism in the said driving means arranged to shift said ratio upon reversal of said driving wheel, a brake between said clutch mechanism and the load wheel and the said driving means driving through the said brake, and means in the said driving means which set the brake upon backward rotation of the load wheel and release the brake upon backward rotation of the driving wheel.

13. In a hoisting block, the combination of the driving wheel, a load wheel, a plurality of driving means therebetween arranged to connect said wheels, some elements being in both driving means, automatically operated clutch mechanism adapted to engage one driving means on forward rotation of the driving wheel and a different driving means on backward rotation thereof, the clutch mechanism thus being in both driving means, and a brake between the clutch mechanism and the load wheel adapted to control the backward rotation of the load wheel.

14. In a hoisting block, the combination of a driving wheel, a load wheel, a gear train, a permanent drive connection from the gear train to the load wheel, a brake arranged to control the backward rotation of an element of the gear train and thereby to control the backward rotation of the load wheel through the gear train, a second gear train between the driving wheel and the brake, connecting means between the gear trains, and clutch mechanism arranged to drive the first gear train through the second gear train on forward rotation of the driving wheel and to drive the first gear train direct on backward rotation thereof.

15. In a hoisting block, the combination of a driving wheel, a load wheel, a gear train, a permanent drive connection from the driven element of the gear train to the load wheel, a brake on the driving element of the gear train, direct driving means from the driving wheel to the driving element of the gear train through the brake which set the brake on backward rotation of the driving element of the gear train and release the brake on backward rotation of the driving wheel, a second gear train between the driving wheel and the driving element of the first gear train, and clutch mechanism which drives through said second gear train on forward rotation of the driving wheel and shifts to the said direct drive on backward rotation thereof.

16. In a hoisting block, a frame of two side pieces, a load wheel therebetween and journaled therein, a drive shaft axially through the load wheel, a planetary gear train exterior to the frame and comprising a central gear, a planet gear member, a carrier, and an annular gear, a connection from the carrier to the load wheel, a brake on the central gear, the drive shaft driving the central gear through the brake whereby the brake controls the central gear in its backward rotation, a second planetary gear train exterior to the frame on the opposite side from the first planetary gear train, a driving wheel exterior to the second planetary gear train, and clutch connections adapted on forward rotation of the driving wheel to drive the drive shaft through the second planetary gear train and on backward rotation of said wheel to drive the drive shaft direct.

17. In a hoisting block, the combination of a frame, a load wheel located centrally thereof and journaled therein, a driving wheel, a drive connection between said wheels comprising two planetary gear trains located on opposite sides of the load wheel, one of said planetary gear trains being always connected in said drive connection and the said driving wheel being located exterior to the other planetary gear train, connecting means between said planetary gear trains, clutch mechanism arranged to couple into said drive connection the said train adjacent to the driving wheel on forward rotation of said wheel and thereby reduce the driving speed, and to drive direct on backward rotation of said driving wheel without reducing through said adjacent planetary gear train, and a brake on an element of the planetary gear train remote from the driving wheel.

18. In a hoisting block, the combination of a frame, a load wheel located centrally thereof and journaled therein, a driving wheel, a drive connection between said wheels comprising two planetary gear trains located on opposite sides of the load wheel and a drive shaft axially through the load wheel, each planetary gear train comprising a central gear, a plurality of planet gear members, a carrier and an annular gear, a brake on the central gear of the planetary gear train remote from the driving wheel, and clutch mechanism adapted on forward rotation of the driving wheel to connect said driving wheel to the drive shaft through the adjacent planetary gear train, and on backward rotation of the driving wheel to connect it to the drive shaft direct.

19. In a hoisting block, a frame of two side pieces, a load wheel therebetween and journaled therein, a drive shaft axially through the load wheel, a planetary gear train exterior to each frame side piece, a driving wheel exterior to one planetary gear train, a brake exterior to the other planetary gear train, and connecting means whereby the driving wheel drives the load wheel forward through both planetary gear trains and the drive shaft and whereby the brake controls the load wheel in its backward rotation.

20. In a hoisting block, a frame of two side pieces, a load wheel therebetween and journaled therein, a drive shaft axially through the load wheel, a planetary gear train exterior to the frame and comprising a central gear movably mounted on the drive shaft, a planet gear member, a carrier, and an annular gear, a connection from the carrier to the load wheel, a brake on the central gear, the drive shaft driving the central gear through the brake whereby the brake controls the central gear in its backward rotation, a second planetary gear train exterior to the frame on the opposite side from the first planetary gear train, a driving wheel exterior to the second planetary gear train, and a forward drive connection from the driving wheel to the drive shaft through the second planetary gear train.

21. In a hoisting block, the combination of a frame, a load wheel journaled therein, a drive shaft axially through the load wheel, a planetary gear train comprising a central gear movably mounted on the drive shaft, a planet gear member, a carrier, and an annular gear, a connection from an element of the planetary gear train to the load wheel, a brake connected on the central gear, the drive shaft driving the central gear through the brake whereby the brake controls the said gear in its backward rotation.

22. In a hoisting block, the combination of a driving wheel, a load wheel, a drive connection therebetween, driving mechanism which is at all times connected in said drive connection, a second driving mechanism which is connected in said drive connection but not at all times, clutch mechanism in the said drive connection controlled by the driving wheel and arranged to drive said first driving mechanism through said second driving mechanism on forward rotation of the driving wheel and to drive said first driving mechanism direct on backward rotation of the driving wheel, and a brake between the clutch mechanism and the first driving mechanism.

23. In a hoisting block, the combination of a driving wheel, a load wheel, a planetary gear train, a second planetary gear train, a connection from an element of the first planetary gear train to the load wheel, driving means between said planetary gear trains, clutch mechanism controlled by the driving wheel and arranged to drive the first planetary gear train through the second planetary gear train on forward rotation of the driving wheel and to drive the first planetary gear train direct on backward rotation of the driving wheel, and a brake between the clutch mechanism and the first planetary gear train.

24. In a hoisting block, the combination of a driving wheel, a load wheel, driving elements therebetween, clutch mechanism in the said driving elements arranged to drive through one combination thereof on forward rotation of the driving wheel and through a different combination thereof on backward rotation of the driving wheel, some elements being in both combinations, and friction elements between the clutch mechanism and the load wheel which are driving elements aforesaid on forward rotation of the driving wheel and braking elements on backward rotation thereof.

25. In a hoisting block, the combination of a driving wheel, a load wheel, driving mechanism therebetween, a one-way clutch in said driving mechanism adapted to engage on forward rotation of the driving wheel, a one-way clutch in said driving mechanism adapted to engage on backward rotation of the driving wheel, and a brake between said clutch mechanism and the load wheel adapted to control the backward rotation of said load wheel at all times.

26. In a hoisting block, the combination of a driving wheel, a load wheel, a gear train, a permanent drive connection from the gear train to the load wheel, a brake on an element of said gear train adapted to control the backward rotation thereof at all times, a second gear train, a one-way clutch on an element of said second gear train adapted to engage on forward rotation of the driving wheel, a one-way clutch on an element of said second gear train adapted to engage on backward rotation of the driving wheel, and connecting means between said gear trains.

In testimony whereof, I have signed my name to this specification, this 6th day of March, 1926.

JOHN W. KITTREDGE.